Patented Jan. 3, 1950

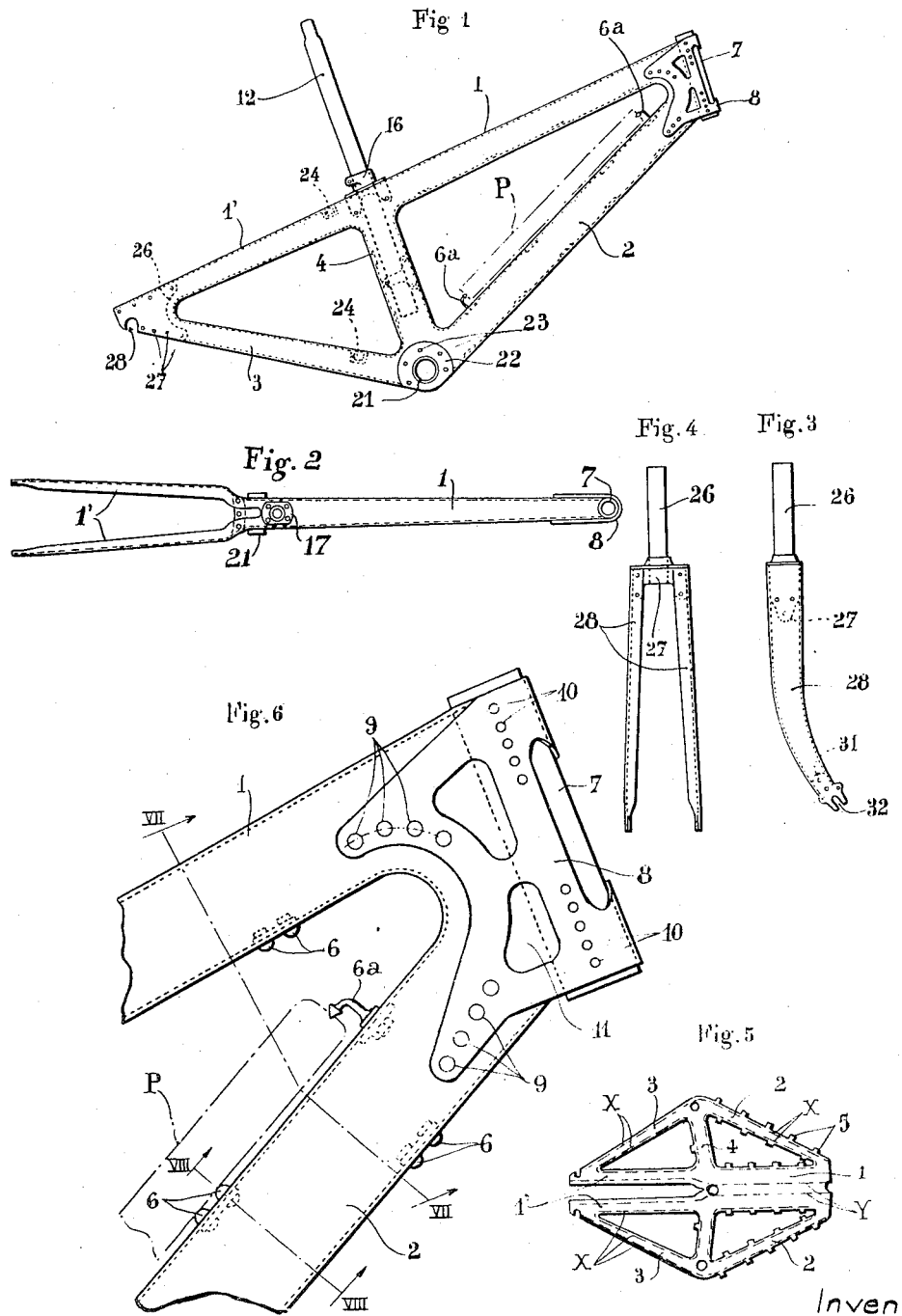

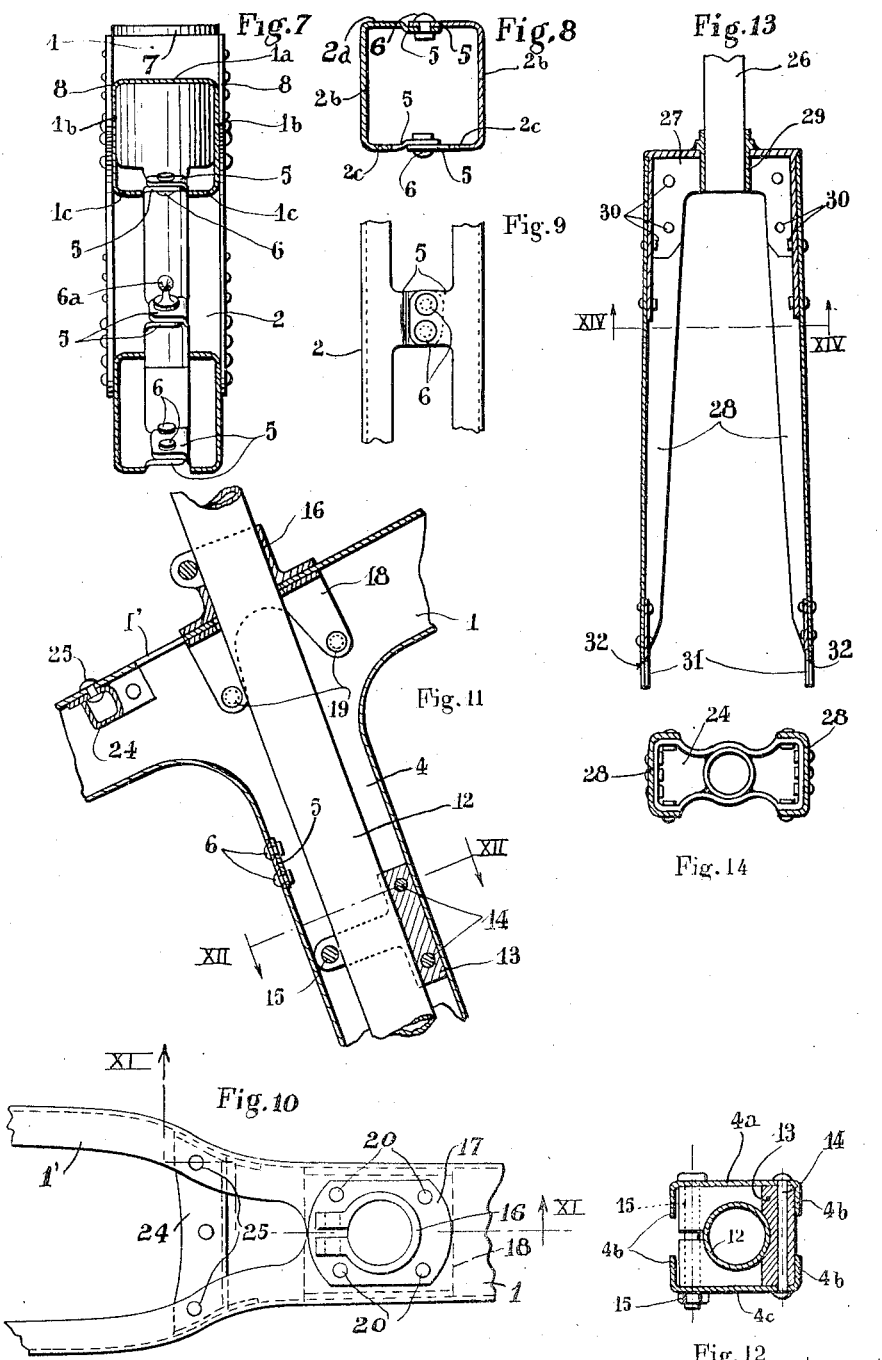

2,493,037

UNITED STATES PATENT OFFICE 2,493,037

CYCLE FRAME

Victor Simon, Villeurbanne, France; vested in the Attorney General of the United States Application August 20, 1945, Serial No. 611,540
In France July 26, 1941

2 Claims. (Cl. 280—281)

My invention relates to frames for cycles and the like.

Cycle frames are generally made by assembling tubular elements of steel or light alloys. This construction is rather expensive owing to the cost of metal tubes and to the difficulties of their assembling by welding, hard soldering, screwing, etc. The work is delicate and sometimes unsatisfactory results are met with, more particularly with aluminum alloys which are difficult to weld. In any case the welding or soldering operation entails an important and expensive fuel consumption.

It has been proposed to manufacture cycle frames by means of pressed sheet-metal, but the known constructions comprise a considerable number of connections by welding or riveting; such connections have to support the mechanical stresses and under the action of vibrations they get slack and give way. Moreover the frames thus obtained were unsightly and led to cycles of abnormal aspect.

A first object of my invention is to provide a cycle frame made of pressed sheet-metal and substantially similar to the known tubular frames.

Another object of my invention is to provide a cycle-frame made of pressed sheet-metal in one main piece without any mechanical connection along its elements submitted to tension or compression stresses.

According to my invention the frame is formed by a metal sheet appropriately cut and bent about two parallel lines in the vicinity of its axis of symmetry so as to form an oblique main element extending rearwardly into a fork carrying the rear axle, the said main element being integral with a second element, more inclined, extending from the steering tube to the pedal hub, with a third element extending upwardly from the pedal hub to the said main element in the direction of the saddle, and with a fourth and last element formed as a fork and extending between the pedal hub and the rear axle.

The main element is substantially U-shaped in section with the edges bent towards each other. The second and third elements are substantially square or rectangular in cross-section and they are formed of two opposed U-shaped portions, each portion being pressed out of one half of the sheet and the two portions being connected with each other by riveted tongues.

In the annexed drawings:

Fig. 1 is a side view of a cycle frame constructed in accordance with my invention.

Fig. 2 is a corresponding plan view, the plane of the drawing being supposedly the plane of the upper face of the main oblique element.

Figs. 3 and 4 are an elevation and a side view of the front fork not illustrated in Figs. 1 and 2.

Fig. 5 is a diagrammatical plan view at a reduced scale showing the sheet of metal adapted to form a frame as illustrated in Figs. 1 and 2, after cutting and punching, but before bending and pressing.

Fig. 6 is a partial large-scale side view showing the front part of the frame of Figs. 1 and 2.

Figs. 7 and 8 are detail sections taken along lines VII—VII and VIII—VIII of Fig. 6.

Fig. 9 is a bottom plan view showing a tongued connection along the lower face of an element.

Fig. 10 is a partial large scale plan view showing the central portion of the frame.

Fig. 11 is a section taken along line XI—XI of Fig. 10.

Fig. 12 is a cross-section taken along line XII—XII of Fig. 11.

Fig. 13 is a longitudinal section of the front fork, the arms of the fork being supposedly rectilinear for the sake of clearness.

Fig. 14 is a cross-section thereof taken along line XIV—XIV of Fig. 13.

The frame illustrated in Figs. 1 and 2 comprises an oblique main element 1—1' which extends rectilinearly from the steering tube to the rear wheel axle, two elements 2 and 3 extending respectively from the pedal hub to the steering tube and to the aforesaid axle, and a third element 4 which connects the pedal hub with the main element.

Between the steering tube and the saddle support, the main element 1—1' is formed of a tube, square or rectangular in cross-section as clearly shown in Fig. 7. This cross-section comprises an uninterrupted horizontal upper edge 1a, two uninterrupted lateral sides 1b and a lower horizontal edge 1c open in its intermediate part, the two portions being bridged by a number of tongues 5 which are superimposed and connected with each other by rivets 6.

Element 2 is also formed of a square or rectangular tube (Fig. 8), but the upper horizontal edge 2a of its cross-section is discontinuous as the lower edge 2c and also comprises bridging tongues 5 with rivets 6 (Figs. 8 and 9). It will be noted that two rivets 6 are provided with bent conical heads 6a (Figs. 1 and 6) which form supports for the usual tyre pump P.

Referring now to Fig. 6, it will be noted that elements 1 and 2 terminate respectively at the upper and lower ends of an inclined steering tube 7. Elements 1 and 2 are connected with each other by their vertical lateral faces and by the lower face of element 1 (corresponding to the lower edge 1c of Fig. 7) which is bent at somewhat less than 180° and becomes the upper face of element 2 (corresponding to edge 2a of Fig. 8). The upper face of element 1 and the lower face of element 2 are recessed at their front ends to accommodate the steering tube 7, the outer diameter of said tube corresponding to the width of elements 1 and 2.

Tube 7 is clamped by means of a U-shaped member 8 (Figs. 1, 2 and 6) which fits on the front end of the frame. Member 8 is fixed to elements 1 and 2 by rivets 9 and to tube 7 by rivets 10. The vertical face of elements 1 and 2 may terminate short of rivets 10 or it may extend somewhat around tube 7 in which case it is clamped between member 8 and tube 7 under rivets 10. Member 8 is preferably wind-shaped, as shown, and extends rearwardly to form re-inforcing means for elements 1 and 2 in the vicinity of their front ends where the bending stresses are at a maximum.

Element 4 is also formed as a square or rectangular tube the cross-section of which comprises two uninterrupted longitudinal sides 4a and 4c (Fig. 12) and two discontinuous transverse sides 4b with edges connected by tongues 5 (Fig. 11) with rivets 6. Element 4 (Fig. 1) is inclined as the saddle tube of a conventional tubular frame; and it is adapted to receive a tubular support 12 for the saddle proper.

Support 12, which is relatively long, is adjustably fixed to element 4 by means of two clamping devices. The first one is formed of a split block 13 (Figs. 11 and 12), rectangular or square in cross-section so as to fit within element 4. Support 12 is passed through block 13 which is split, as shown; block 13 is fixed to element 4 by means of two rivets 14 and of a bolt 15 which clamps support 12 in position.

The second clamping device is formed of a split collar 16 (Figs. 10 and 11) integral with a flange 17 which bears against the upper face of element 1. There is also provided within the latter a U-shaped member 18 adapted to fit within element 1 and comprising wings fixed to the same by means of rivets 19. Flange 17 and member 18 are assembled by means of rivets 20 which are passed through the upper face of element 1.

The pedal hub is fixed at the lower end of element 4 and it is formed of a tube 21 (Fig. 1) provided with two flanges 22 fixed by rivets 23 to the vertical or lateral faces of elements 2 and 4. Flanges 22 may be welded or threadably attached to tube 21.

Elements 3 and the rear part 1' of element 1—1' are formed as forks with U-shaped arms. Fig. 10 clearly shows the junction between the forked portion 1' and the unforked portion 1 of element 1—1'. The fork is obtained by dividing in two the upper face of portion 1 and the two arms thus formed are brought apart. It will readily be understood that fork 3 is formed in the same manner.

The two arms of each fork are connected with each other by stays 24 (Figs. 1, 10 and 11) made of bent metal and fixed in position by rivets 25. Stays 24 facilitate the attachment of a conventional mud-guard and increase the transverse stiffness of the frame.

The two forks 1' and 3 are connected with each other at the rear and are re-inforced by plates 26 (Fig. 1) fixed by rivets 27. Their vertical faces are notched as indicated at 28 to receive the rear wheel axle.

The frame described is obtained by cutting, punching, bending and pressing a single sheet of metal, without any mechanical connection between the main elements. Fig. 5 diagrammatically shows the blank after cutting and punching, but before bending and pressing. The metal is then bent along lines X and thereafter along lines Y by means of appropriate tools. The frame is then finished by riveting.

My invention permits the main portion of a cycle frame to be manufactured from a single sheet of metal by successively employing the simple steps of punching a sheet of material, then bending the punched sheet about an axis or axes of symmetry to bring the extreme edges together, and then riveting the edges.

I claim:

1. In a pressed-metal frame for cycles and the like, a frame element comprising an integral U-shaped member with tongues projecting from the edges thereof in respective registering relation, said edges being bent at right angles towards each other but spaced from each other with the tongues in superimposition and riveted to each other, to form a rectangular cross-section with an opening in the middle part of side thereof, said opening being bridged by said riveted superimposed tongues.

2. A cycle frame made of pressed metal sheet, comprising a steering tube, a pedal hub, a main element extending obliquely from the steering tube to the rear-wheel axle, a second element extending from the steering tube to the pedal hub, a third element extending upwardly from the pedal hub to the said main element in the direction of the saddle, a fourth element extending between the pedal hub and the rear wheel axle, a split collar fixed on the main element of the frame substantially co-axially with said third element, a split block fixed within said third element with a bore substantially in co-axial relation to the latter element, and a tubular saddle support driven through said split collar and through said split block, and adapted to be clamped in position by the action of said collar and block.

VICTOR SIMON.

REFERENCES CITED

The following references are of record in the file of this patent:

UNITED STATES PATENTS

| Number | Name | Date |
|---|---|---|
| 481,053 | Owen | Aug. 16, 1892 |
| 642,493 | Rosenberg | Jan. 30, 1900 |
| 840,271 | Verschave | Jan. 1, 1907 |
| 1,998,992 | Johnson et al. | Apr. 23, 1935 |

FOREIGN PATENTS

| Number | Country | Date |
|---|---|---|
| 14,669 | Switzerland | May 12, 1897 |
| 632,166 | France | Sept. 27, 1927 |
| 678,753 | France | Jan. 2, 1930 |